(12) United States Patent
Stobbe et al.

(10) Patent No.: US 7,699,903 B2
(45) Date of Patent: Apr. 20, 2010

(54) POROUS CERAMIC BODY AND METHOD FOR PRODUCTION THEREOF

(75) Inventors: Per Stobbe, Holte (DK); Udo Hack, Heroldsbach (DE)

(73) Assignees: Saint-Gobain Industrie Keramik Rödental GmbH (DE); Liq Tech (DK)

( * ) Notice: Subject to any disclaimer, the term of this patent is extended or adjusted under 35 U.S.C. 154(b) by 950 days.

(21) Appl. No.: 10/563,893

(22) PCT Filed: Jul. 8, 2004

(86) PCT No.: PCT/EP2004/007521

§ 371 (c)(1),
(2), (4) Date: May 22, 2006

(87) PCT Pub. No.: WO2005/005016

PCT Pub. Date: Jan. 20, 2005

(65) Prior Publication Data

US 2006/0236668 A1  Oct. 26, 2006

(30) Foreign Application Priority Data

Jul. 9, 2003 (DE) .............................. 103 31 049

(51) Int. Cl.
*B01D 46/00* (2006.01)
*B01D 39/20* (2006.01)

(52) U.S. Cl. ............................ 55/523; 55/487; 55/524; 55/DIG. 5; 95/273; 95/285; 264/628; 264/632; 264/682; 264/122; 264/DIG. 48; 501/80; 501/88; 210/503; 210/510.1

(58) Field of Classification Search .................. 55/486, 55/487, 523, 524, DIG. 5; 96/4, 11; 95/273, 95/285; 264/628, 632, 682, 122, DIG. 48; 501/80, 88; 210/500.21, 503, 510.1
See application file for complete search history.

(56) References Cited

U.S. PATENT DOCUMENTS

| | | | | |
|---|---|---|---|---|
| 4,946,487 A | * | 8/1990 | Butkus | 55/523 |
| 5,679,248 A | * | 10/1997 | Blaney | 210/510.1 |
| 5,762,841 A | * | 6/1998 | Shimai et al. | 264/628 |
| 5,853,444 A | * | 12/1998 | Maier et al. | 55/523 |
| 6,126,833 A | | 10/2000 | Stobbe et al. | |
| 6,214,078 B1 | * | 4/2001 | Way et al. | 55/523 |
| 7,112,237 B2 | * | 9/2006 | Zeller et al. | 55/523 |
| 2004/0112024 A1 | * | 6/2004 | Noguchi et al. | 55/523 |

FOREIGN PATENT DOCUMENTS

| | | |
|---|---|---|
| DE | 3149796 A1 | 6/1983 |
| GB | 790 672 A | 3/1956 |
| GB | 790672 * | 2/1958 |
| WO | WO 00/01463 * | 1/2000 |
| WO | WO 03024892 A | 3/2003 |

OTHER PUBLICATIONS

Kriegesmann et al. "Characterizing the Consolidation of Bimodally Distributed Fine-Grained Silicon carbide Powders", CFI Ceram Forum Int, vol. 79, No. 12, Dec. 2002, pp. D32, E37-44.*
Kriegesmann J., et al.: "Consolidation Behaviour of Extremely Fine Grained Recrystallized Silicon Carbine." Keramische Zeitschrift, vol. 51, Nov. 8, 1999, pp. 648-652.
Kriegesmann J., et al.: "Characterizing the Consolid. of Bimodally Distributed Fine-Grained Si Carbide Powders" CFI Ceram Forum Int, vol. 79, No. 12, Dec. 2002, pp. D32, E37-44.
Written Opinion of the International Searching Authority for International Application No. PCT/EP2004/007521.

* cited by examiner

*Primary Examiner*—Jason M Greene
(74) *Attorney, Agent, or Firm*—Van Dyke, Gardner, Linn & Burkhart, LLP

(57) ABSTRACT

The present invention relates to a method for production of a porous ceramic body and a corresponding porous ceramic body which can find application, in particular, as filter, or filter membrane in cross-flow filtration. According to the method of the invention, a bimodal ceramic powder mixture is moulded to give a moulded body, which is subsequently recrystallised by conditioning at high temperature, such that the fine particles melt and link the large particles firmly together by deposition thereon, such that, in defined regions (2,3), a porous ceramic body with a homogeneous structure of almost uniform particle size and pore size is formed, whereby the pores provide an interconnected, open, three-dimensional network.

27 Claims, 7 Drawing Sheets

1000  2000  3000

POROUS CERAMIC BODY AND METHOD FOR PRODUCTION THEREOF

BACKGROUND OF THE INVENTION

The present invention concerns a method for the production of a porous ceramic body, especially a filter membrane and a porous ceramic body and its use in a filter, especially in a so-called cross-flow filter.

In a wide range of industrial areas, such as chemical engineering, food technology etc, liquid material streams (fluids) have to be filtered. To an extent depending on the size of the materials to be filtered out, a distinction is made between microfiltration (MF), ultrafiltration (UF) and nanofiltration (NF). The smaller the grains to be filtered out, the higher the demands imposed on the filter technology and the filter membranes used thereby.

For MF, UF and NF filter applications, so-called cross-flow filtration is known from the prior art in which the material stream to be filtered flows parallel to the filter surface. In the pressure-driven separating process of cross-flow filtration, the material stream to be filtered out is split by the filter membrane into two outlets streams, namely a purified stream, the so-called filtrate or permeate, and a second stream, the so-called residue stream or retentate.

By the agency of the perpendicular diversion of filtrate or permeate to the feed stream or filter membrane, two speeds can be distinguished in cross-flow filtration, more precisely the filtrate speed perpendicular to the filter surface and the cross-flow speed parallel to the filter surface. In cross-flow filtration, optimization of the ratio of filtrate speed to cross-flow speed is especially important. The cross-flow speed, which is the mean value of the material stream at the inlet and outlet at the filter, ranges in known industrial applications from 1 to 10 m per second, with a TMP (see below) of 2.5 bar producing in the test on water a flow of approximately 500 to 2500 liters per $m^2$ bar per hour for MF and UF membranes having pore sizes ranging from 0.1 to 1 A 0.5 µm. To an extent depending on the application as filter, a flow of 50 to 500 l per $m^2$ bar per hour usually becomes established.

An increase in the cross-flow speed generally leads to a rise in flow on account of a higher shear rate. This promotes more efficient removal of the grains from the material stream because a dynamic layer forms on the membrane surface. A disadvantage in this regard, however, is that an increased cross-flow speed is accompanied by an increased pumping requirement.

The filtrate speed is directly dependent on the pressure applied across the filter membrane, the so-called TMP (transmembrane pressure) under the assumption of a given filter surface and otherwise equal conditions. The TMP is typically 5 bar, but there have already been isolated instances of the use of membranes working continuously at more than 10 bar.

An ideal filter membrane for the purposes of cross-flow filtration exhibits a linear flow/lifetime curve for a given fluid and otherwise unchanged conditions.

In special applications, the described cross-flow filters may also be used as so-called dead-end filters by closing the filter outlet.

Ceramic membranes for use as MF and UF membranes in cross-flow filters are already known. These typically consist of oxides of the elements aluminum, silicon, titanium and zirconium or mixtures thereof In this regard, the membranes are positioned on so-called filter carriers that are produced from the same oxides or from other ceramics, such as cordierite and silicon carbide.

The oxide ceramic membranes or so called white membranes are sintered onto a filter carrier in a large number of layers of increasingly finer grain size. The white ceramic membranes of oxide ceramic prepared in this way have a continuous and broad grain size distribution of very small grains in the micro- and sub-micro or nano-range within each layer. This also yields a very broad grain size distribution, with especially a large number of very small pores of very narrow pore channels forming that become partly sealed by the fraction of melt phase during sintering, a fact which leads to so-called dead ends, and counteracts good filtering properties on the part of the membrane. Especially, this leads to a situation in which the flow through such membranes is restricted and therefore more energy has to be expended on pumping in order that the aforementioned cross-flow rates of 2 to 8 m per second may be obtained at 2 to 5 bar TMP for MF and UF filtration.

To counteract these problems, there have already been endeavors to replace the so-called white membranes of oxide ceramic by so-called black membranes of non-oxide ceramic, such as SiC, since it is known how to make SiC carriers for filter membranes having large pores but narrow pore size distribution (see FIG. 2, left and lower section). A method for producing a corresponding filter device with an SiC filter membrane is described in WO 03/024892. In this method, primary α-SiC grains having a grain size of 1-475 µm, a silicon donor material that is not an SiC compound, organic grains having a grain size of $1 \times 10^{-5}$ to 20 µm and at least one organic binder are molded to form a green body, then dried, and pyrolyzed in an oven under a protective atmosphere in order to transform the organic binder into a carbon binder such that the latter reacts with the melting silicon donor to form fine nanoscale β-SiC, which is then transformed at very high temperatures into very fine nanoscale α-SiC grains, which finally produce the link at the grain boundaries of the primary of α-SiC grains. This method, which involves very high outlay on account of the large number of starting materials and the high firing temperatures, also has the disadvantages that hardly any suitable silicon donor substances are available because silicon is flammable at grain sizes <6 µm and contents exceeding 100 g per $m^3$ air must be avoided during grinding. In addition, it has already transpired during the production of filter carriers by this method that the carbon compounds formed during pyrolysis or the nano-SiC grains do not exhibit sufficient recrystallization in the usual temperature range for the recrystallization of filter carriers, with the result that, by the agency of the residual fine grains in the pore space, the strength of the ceramic body thus formed and the ability of the permeate to flow through it are impaired and no serviceable filter carriers can be produced.

The quoted range of 1 to 475 µm for the SiC primary grains is additionally much too coarse for the production of membranes for MF and UF filtration. Further, the described method of metallic silicon and carbon carriers is not suitable for the production of filter membranes because full recrystallization of the raw materials by this method requires temperatures much higher than are needed for the selective setting of uniformly fine α-SiC grains for the membranes and therefore giant grain growth in the membrane layer is unavoidable. An example of giant grain growth is shown in FIG. 6.

A further method for the production of SiC membranes is described in WO 92/11925. In this method, however, so-called binder grains are used that sinter at a temperature which is much lower than the sintering temperature of the SiC grains to be linked. This is not possible for the simple reason that pure SiC has no melting point, yet partial melting of the ceramic grains is precisely the characteristic feature of sintering. (To sinter SiC, addition of so-called sintering agents, e.g., aluminum, boron, and carbon, is necessary which generate a low quantity of melt phase. The goal here is always a dense material that can only be realized by means of shrinkage in the order of 20% and that is totally unsuitable for filter purposes).

SiC recrystallizes, however, at correspondingly high temperatures via surface diffusion or gas transport, i.e. energetically unfavorable, small grains dissolve and the material is deposited again without change in volume on energetically more favorable points, especially where two large grains make contact.

By RSiC is generally meant a recrystallized, porous material of 100 percent α-SiC as distinct from SSiC (sintered, mostly dense SiC materials with sintering agents) and oxide- or nitride-bound SiC materials or such kind with other binder phases of a different nature.

The use of chemically different binder grains in accordance with WO 92/11925, however, suffers from the disadvantage that the resistance to environmental influences and corrosion is impaired, a fact which is disadvantageous, however, for use as filter material. In addition, the chemical disparateness of filter grains and binder material also causes problems with the binding quality and the strength of the filter body. Furthermore, the use of different materials also creates difficulties during manufacture since impurities may give rise to eutectic melts that also are undesirable for the formation of a filter body. Further, by the agency of the sintering of the binder material and thus of the associated melting of this material in filter bodies, vitreous phases are present in this method that lead to sealing of the pore channels and to the formation of dead areas in the filter body, a fact which negatively affects filter performance.

In both papers on the prior art, filter membranes of SiC are apparently mentioned only as other possibilities within the context of a general listing; the key parameters that are especially important here, such as grain size distribution of the primary grain, temperature control during recrystallization and the resultant filter performance are, in contrast, not revealed.

SUMMARY OF THE INVENTION

It is therefore an object of the present invention to create a porous ceramic body, especially a filter membrane of SiC for use in cross-flow filtration, said ceramic body having good strength, good filter properties and good resistance to environmental influences. In addition, production of such a porous ceramic body is to be simple and efficient and said ceramic body is to have a long service life combined with maximum possible filter performance.

This object is achieved with a method having the characteristics of claim 1 and a porous ceramic body with the features of claim 16 as well as a filter with the features of claim 23. Advantageous embodiments are the subject of the dependent claims.

According to the invention, a porous ceramic body, preferably of SiC having a strong, uniform and homogeneously distributed porosity with continuous, roughly equally-sized pores in a three-dimensional pore network is created by producing a powder mixture of SiC grains with a bimodal grain size distribution and molding it into a desired shape. As will be described in more detail, two grain size classes are essential here, with the first grain size class preferably having a defined upper and lower grain size, and the second grain size class preferably having at least a defined upper grain limit. Admittedly, the essential aspect is that a certain mixing gap exists between the two grain size classes. During subsequent temperature conditioning, recrystallization takes place, with the grains of the second grain size class, which have preferably been chosen correspondingly small, disappearing during the crystallization to the benefit of the large grains and thus generating a between the large grains, with uniform pores being formed between the large grains in a process involving no volume change. In this way is formed a very homogeneous, porous ceramic body having an open porosity without dead sections that is ideally suited for filter purposes. The two grain size classes can preferably each be used on their own with a very narrow grain size band complying with the international standardization of DIN ISO 8486-2 for grains up to F1200 (3 μm) and JIS R6001 for grains up to JIS 8000 (1 μm). This and the ratio of large to small grain sizes determines the mean grain size of the grains in the finished ceramic body and the mean pore size such that a very narrow pore and grain size distribution can be obtained in the case of a narrow grain size band. It is however also possible that both the large grain size class and the finer grains, which are completely consumed during recrystallization, consists of several grain fractions, with the important factor especially being the size ratio between the finest grains of the large grain size class and the largest grain of the fine grain size class. The fine grains may especially also be a so-called run-of-the-mill grade having a broad grain distribution but clearly defined upper grain limit. After recrystallization, both the grain size of the grains and the pore size move in a very narrow, defined range. In addition, the effect of the recrystallization is that the grains of the finished porous ceramic body have a rounded shape, a fact which also positively affects the filter properties and the service life of a corresponding filter membrane.

Preferably, production of the bimodal ceramic body mixture described in more detail above makes use of two batches of ceramic powders with an initial mean large grain size (coarse grains) and a second mean smaller grain size class (fine grains), which additionally have defined maximum and/or minimum grain sizes, see DIN ISO 8 486-2 for grains up to F1200 (3 μm) and JIS R6001 for grains up to JIS 8000 (1 μm). Even finer powders with similarly narrow grain bands are obtainable from different manufacturers: JIS 9000 ($d_{50}$=0.75 μm), JIS 10000 ($d_{50}$=0.60 μm) or JIS 20000 ($d_{50}$=0.40 μm). In line with the standards, upper ($d_3$) and lower ($d_{94}$) limits are specified for the grain sizes in addition to the mean grain size $d_{50}$. By the agency of these upper and lower limits for the grains (grain size class), especially the resultant grain size in the finished, porous ceramic body and also the pore size is kept even more defined in a narrow range. In this way, it is possible to generate a filter membrane with a homogeneous, uniformly definable adjustable pore and grain size.

Preferably, the size ratio between the first and second ceramic powder, that is between coarse grain and fine grain, is in the range 6:1 to 2:1, preferably 4:1 to 3:1. The ratio is limited for very fine first grains to 2:1 due to the availability of suitable second grains. The mixing ratio between first and second grain is 6:1 to 1:1, preferably 4:1 to 2:1. As already mentioned above, due to the size ratio and/or mixing ratio, the change in grain size in the finished product can also be adjusted to the starting grain size or the grain size in relation to the pore size. Advantageous combinations are each dependent on the desired pore size and are to be chosen such that the highest possible packing density is obtained in the unfired membranes. A fine grain fraction that is too small or too large impairs the strength following recrystallization; either because too little fine grain is available for the recrystallization or because too high a fine grain fraction hinders direct contact between first large SiC grains and leads to higher porosity with larger pores.

In an interesting embodiment of the method, several layers of porous ceramic bodies are deposited in succession in accordance with the method of the invention such that a gradient of the mean grain size or of the pore size can be adjusted in the layer body. In this way, it is possible, for example, on a coarse-porous substrate, for example, a filter carrier, to generate a membrane with ever declining pore diameters and grain sizes.

According to one aspect of the method, for a first layer, the grain sizes of the first ceramic powder are in the range 6.5 μm (FEPA 800) to 23 μm (FEPA 360), for a second layer in the range 1.5 μm (JIS 7000) to 6.5 μm (FEPA F800) and for a third layer in the range 0.5 μm (JIS 10000) to 2 μm (JIS 6000), with preferably JIS 6000 being used as the second ceramic powder for the first layer, JIS 9000 for the second layer, and JIS 20000 for the third layer, or in each case equivalent grain bands.

With the method of the invention, it is thus possible to use non-oxide ceramic and especially SiC (α-SiC) for the production of filter membranes, with a uniform, inter connected, three-dimensional pore structure capable of being generated.

Preferably, the ceramic powder mixture in the method of the invention is processed to form a slurry or slip and a green body is generated by means of a wet-forming method, such as casting. After a drying stage, the green body is subjected to recrystallization, with the temperature and the duration of the heat treatment depending on the chosen grain sizes. For the production of a three-layer filter membrane, for example, the ceramic powder may have a mean grain size for the first grain ranging from 6.5 to 23 μm for the first layer, from 1 to 9 μm for the second layer, and from 0.5 to 2 μm for the 3rd layer, while the fine grain is chosen accordingly in the range spanning 0.3 to 2.0 μm, depending on the coarse grain fraction. The smaller the grain sizes of the corresponding layer, the lower the temperature and the shorter the heat treatment has to be chosen for recrystallization, with guideline figures for the layers described of 90 minutes at 1950° C. serving for the first layer, 60 minutes at 1800° C. for the second layer and 30 minutes at 1750° C. for the 3rd layer.

To an extent depending on the size of the ceramic grains employed, preferably α-SiC grains, the exact temperature and time duration has to be determined on a case by case basis, with the correct temperature and duration having been chosen when the fine second grains in the finished and porous ceramic body have completely disappeared and no giant grain growth (overfiring) has occurred. Between these two limits, the temperature and time must be chosen accordingly, such that the grains in the membrane layers are as round as possible, see FIGS. 2 and 3.

With the method of the invention, it is thus possible, given the correct temperature control, to create porous ceramic bodies or filters and, here especially, cross-flow membrane filters or membranes that have a homogeneous structure of virtually uniformly sized pores and grains, with the pores present in a interconnected, three-dimensional network and the ceramic grains having an essentially rounded shape on account of the recrystallization.

An advantage of the ceramic bodies of the invention is that no melt phase occurs during recrystallization and so the ceramic body is essentially free of a vitreous structure or a melt phase, which forms during sintering by the prior art on account of the partly melted grains. The ceramic body of the invention is additionally characterized by the fact that the ceramic grains of non-oxide ceramic and especially SiC (α-SiC) are not in an amorphous state, but are essentially 100% crystalline on account of the recrystallization.

It is thus possible to generate porous ceramic bodies with defined pore and grain sizes having a uniform, open pore network with a porosity of 35% to 65%, preferably of 50% porosity (estimated from the optical microscope images), exclusively of α-SiC, which is applied as a filter membrane to a coarse-porous carrier also of SiC.

Further advantages, characteristics and features of the present invention will become apparent from the following specification in conjunction with the drawings.

DETAILED DESCRIPTION OF THE PREFERRED EMBODIMENT

In accordance with the method of the invention, RSiC carriers based on the coarse grain of an SiC fraction F240 in accordance with DIN ISO S466-2 of 25 mm diameter and 302 mm length were produced by extrusion and subsequent heat treatment at elevated temperatures. On this RSIC carrier was deposited the first membrane layer of a slurry that consists of 30% SiC grains (75% F600 and 25% JIS 9000), 5% of a 10% polyvinyl alcohol solution as a temporary binder for the green body and 65% water.

Figure 1:
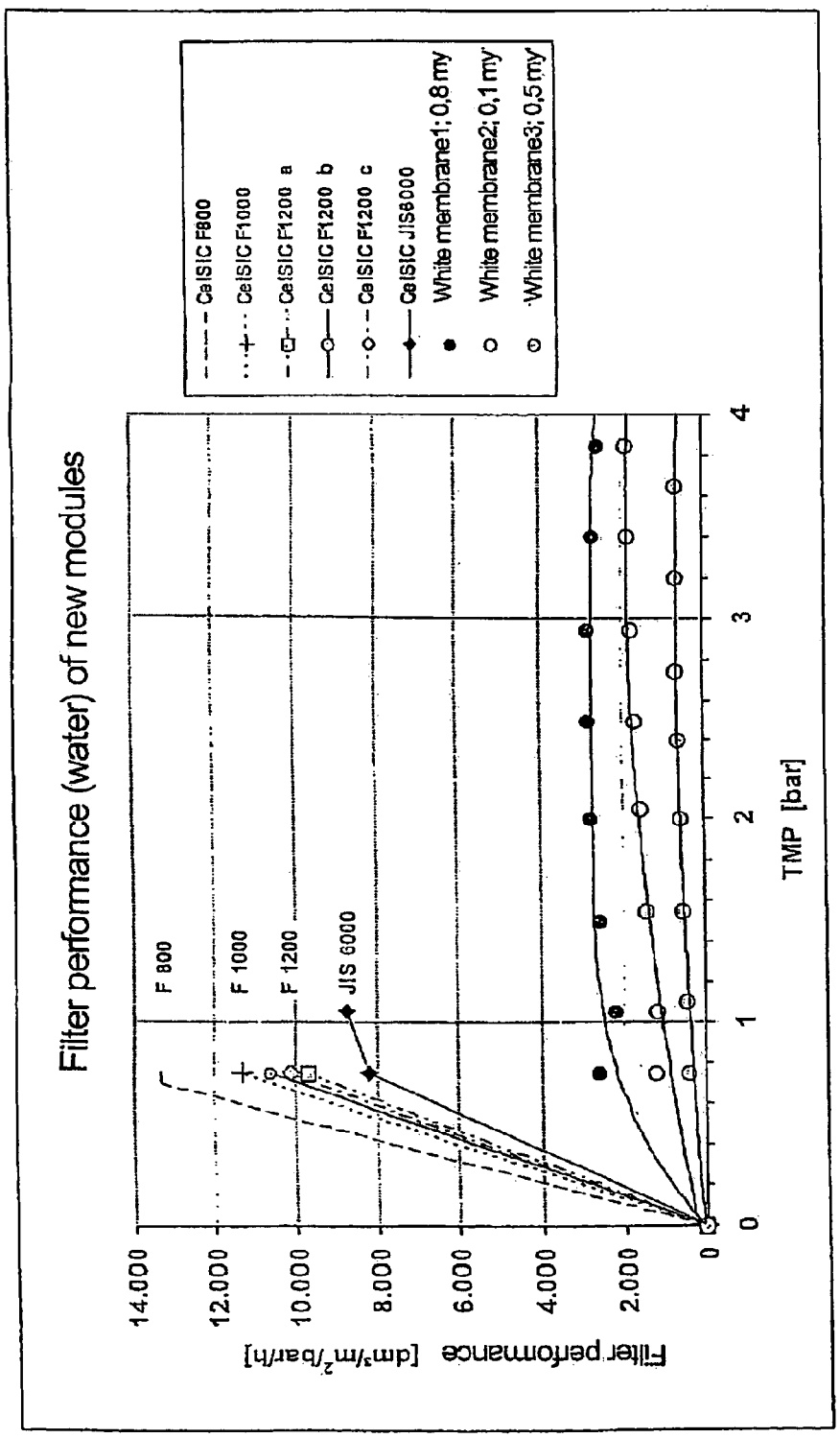
FIG. 1. Illustrates flow plotted against pressure (TMP) for membranes produced in accordance with the present invention compared with conventional membranes.

This layer was fired after drying for two hours at approximately 1950° C. Onto this first membrane layer, which serves to reduce the pore size of the SiC carrier, was deposited a second membrane layer, more precisely of different grain size distributions from F800 to F1200 as coarse grain with JIS 9000 as fine grain and JIS 6000 to JIS 9000 as coarse grain and JIS 20000 as fine grain. After drying, the corresponding modules were fired at 1850° C., 1800° C. and 1750° C. in argon for 60 and 30 minutes to form approximately 0.2-mm-thick, porous, recrystallized membranes on SiC carriers. With these filter elements produced in this way, cross-flow filter trials were performed whose results are shown in FIG. 1. It can be seen here that the filter membranes of the invention in the test of new modules with water at a surprisingly low TMP of <1 bar already have a flow many times that of comparable specimens with defined white membranes having different pore sizes of 0.1 to 0.8 µm diameter. Higher TMPs are not possible on the conventional test rig on account of the unusually high permeability of the new filter modules; in a second experiment involving a slurry of 2% baker's yeast in water, it was further shown that even a membrane of F1000 grains is capable of a separating resolution >99.5%. This shows that the filter modules produced in accordance with the invention have a much better pore structure than was possible in the case of conventional filter elements.

Figure 2:
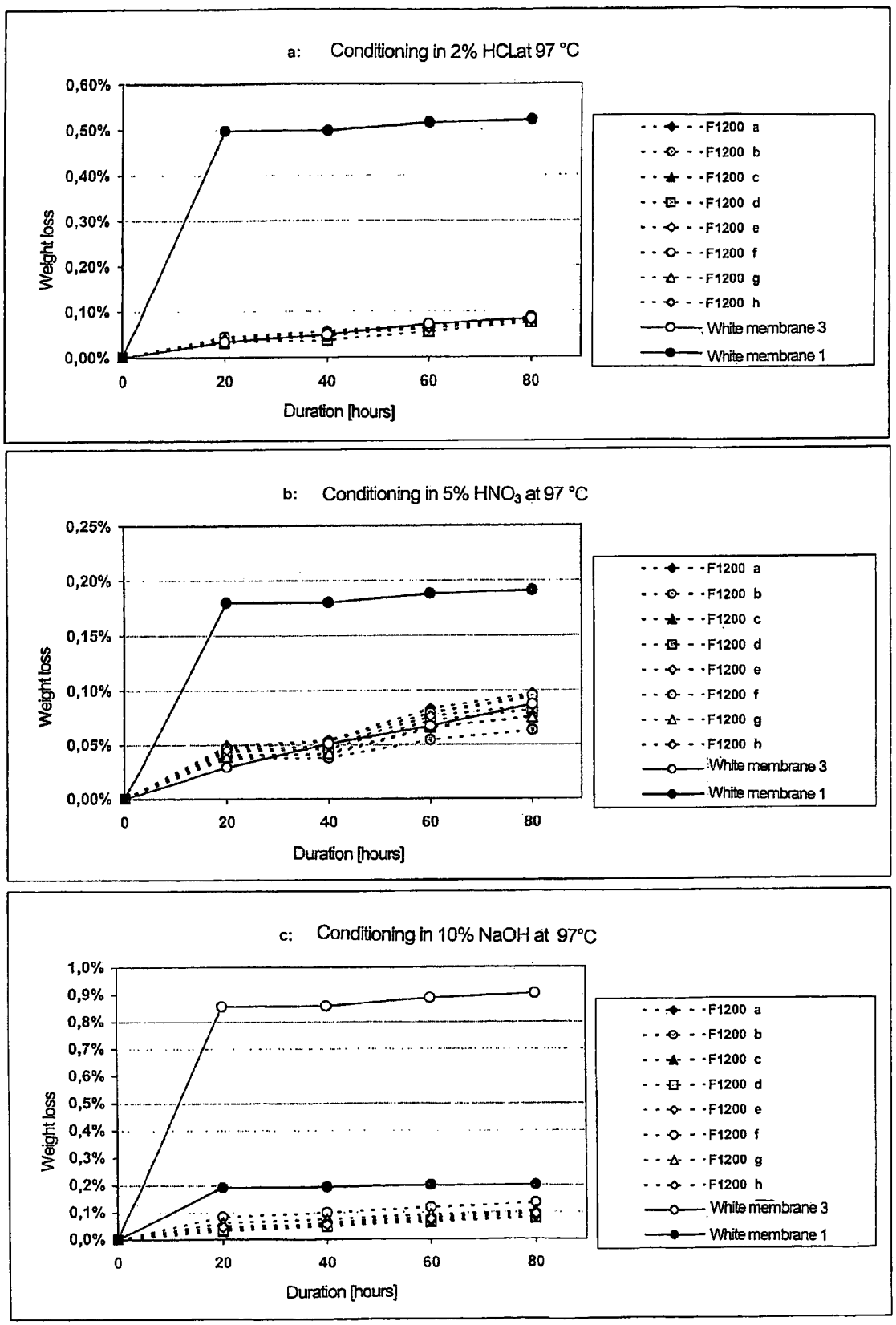
FIG. 2a. Illustrates the outstanding chemical resistance of approximately 45-mm-long filter sections following conditioning in 2% HCL at 97° C.
FIG. 2b. Illustrates the outstanding chemical resistance of approximately 45-mm-long filter sections following conditioning in 5% $HNO_3$ at 97° C.
FIG. 2c. Illustrates the outstanding chemical resistance of approximately 45-mm-long filter sections following conditioning in 10% NaOH at 97° C.
Figure 3:
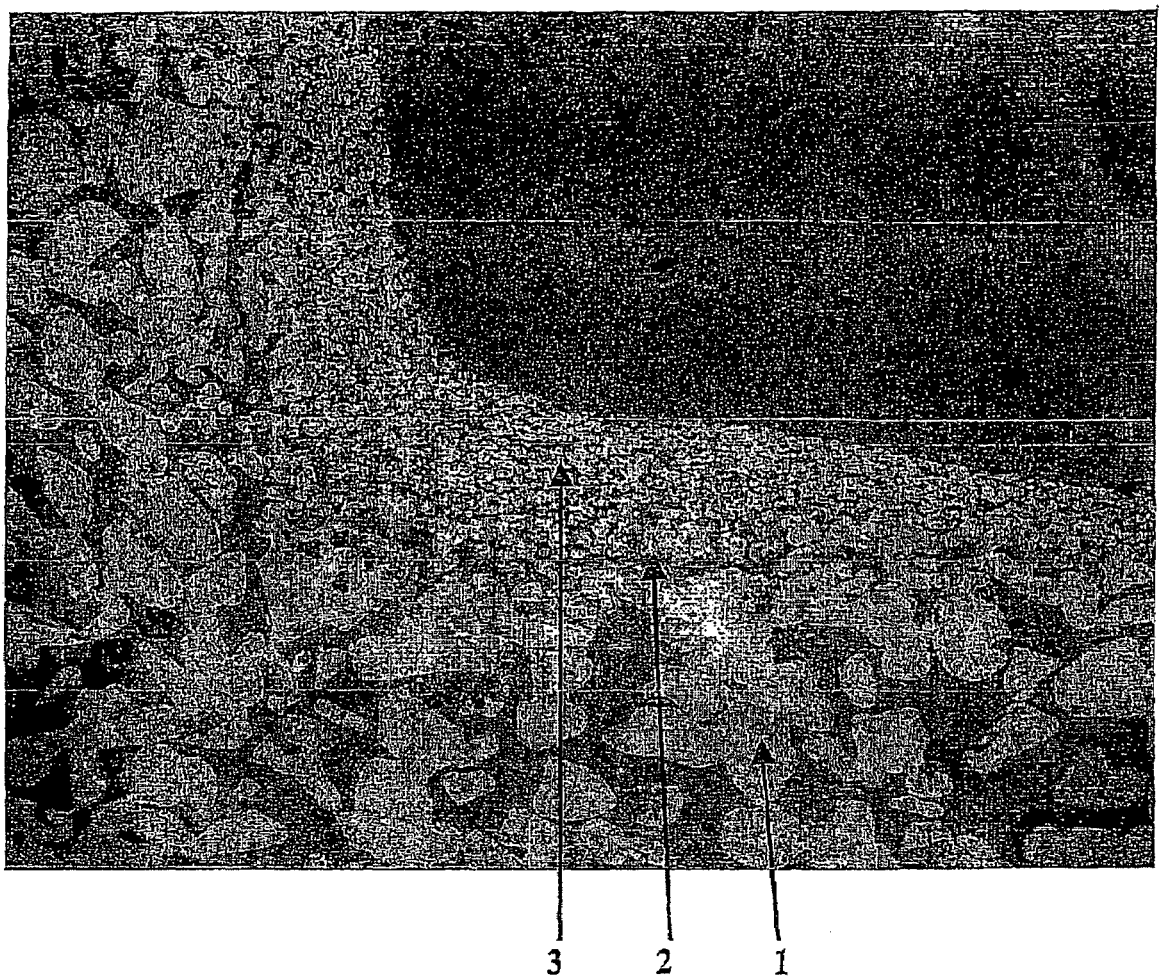
FIG. 3. Illustrates a polished section of a two-layer SiC membrane in the corner of a quadratic channel of a conventional SiC carrier with a mean grain size of approximately 9 μm (F600) in the first layer and approximately 3 μm (F1200) in the second layer at 240-fold magnification.

FIGS. 2 a-c further show the good chemical resistance of the membranes of the invention, which exhibit a lower weight loss and thus less corrosive attack in the comparative tests.

To selectively change the pore size distribution of the membranes and/or the casting behavior of the slips, it is also possible for the first grain size class to consist, e.g. of 40% F 600 (9 µm) and 30% F1200 (3 µm) and the second grain size class of 20% JIS 9000 (1 µm) and 10% JIS 20000, with the smallest grain of the first grain size class and the largest grain of the second grain size class exhibiting the minimum size ratio of 2:1 needed for recrystallization (3:1 in the example).

Further examples of SiC filter membranes produced in accordance with the invention on coarse-porous SiC carriers are shown in FIGS. 3 to 6. FIG. 2 shows in a polished section a double-layer SiC membrane on an SiC carrier at 240-fold magnification. On the SiC carrier 1, two layers 2 (F600) and 3 (F1200) of SiC membranes may be seen that each have a very homogeneous and uniform as well as narrow grain size and pore size distribution. The same applies to the double-layer membrane (layers 20 and 30) on the SiC carrier 10 of FIG. 3, also at 240-fold magnification. Membrane 20 was produced with coarse grain of an SiC fraction with grain size distribution F600 and fired at approximately 1950° C. for 90 minutes. Membrane 30 was produced from JIS 6000 and fired at approximately 1800° C. for 60 minutes.

Figure 4:
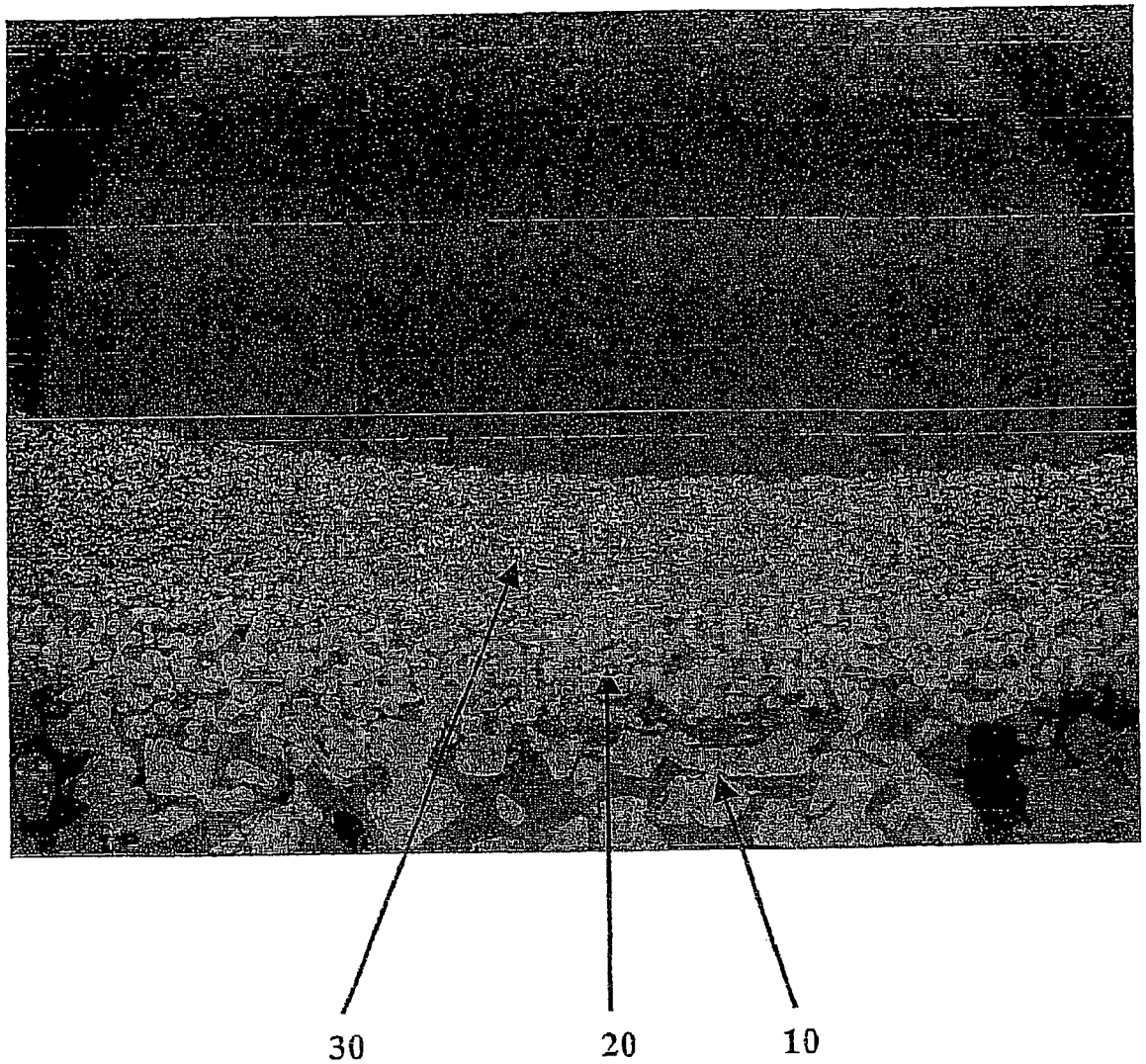
FIG. 4. Illustrates a polished section also of a two-layer SiC membrane from the center of a quadratic channel of an SiC carrier with the same first layer as in FIG. 2 and approximately 2 μm (JIS 6000) in the second layer at 240-fold magnification.

The rounded shape of the SiC grains, especially in the membrane, may be clearly seen in the scanning electron micrograph of FIG. 4, where an SiC membrane 200 on an SiC carrier 100 is shown.

Figure 5:
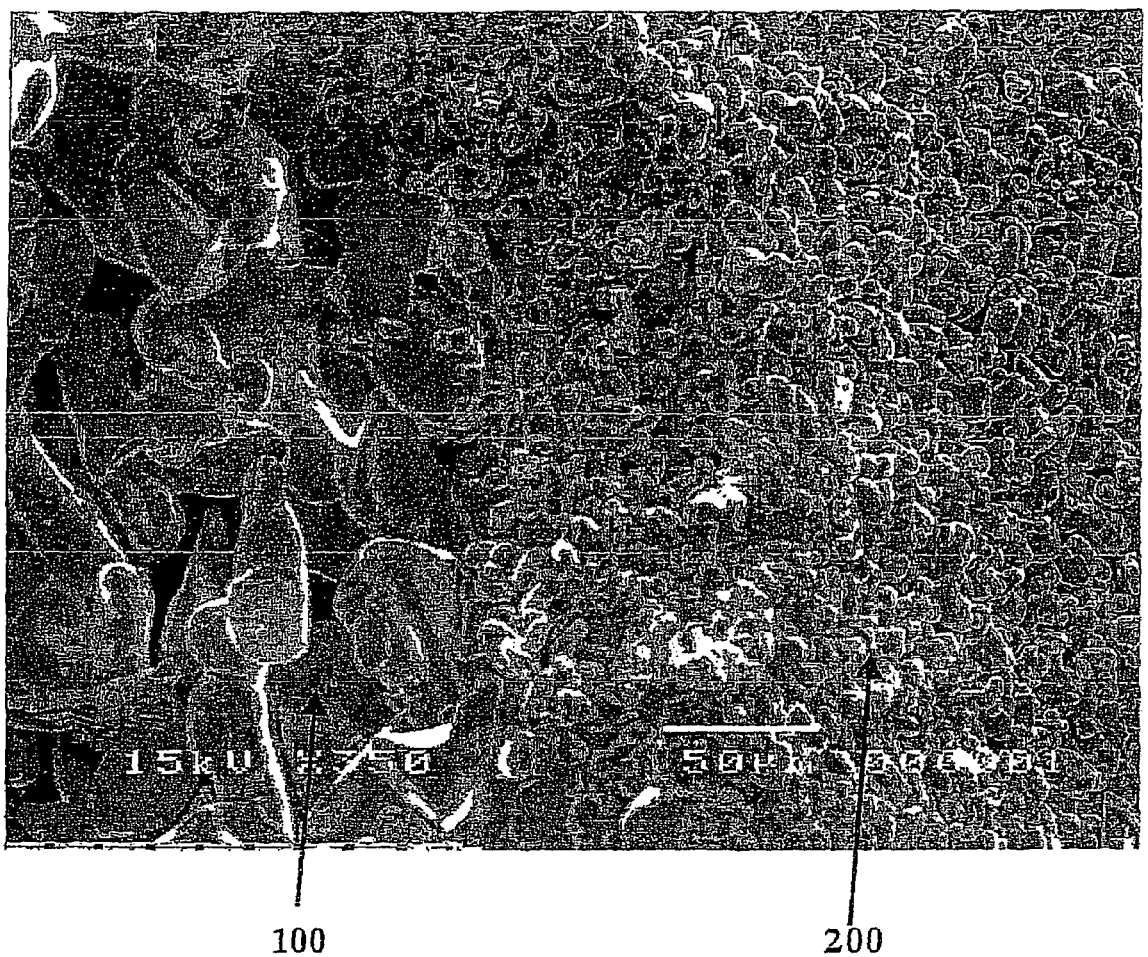
FIG. 5. Illustrates a scanning electron micrograph of an SiC membrane on an SiC carrier in accordance with the invention.
Figure 6:
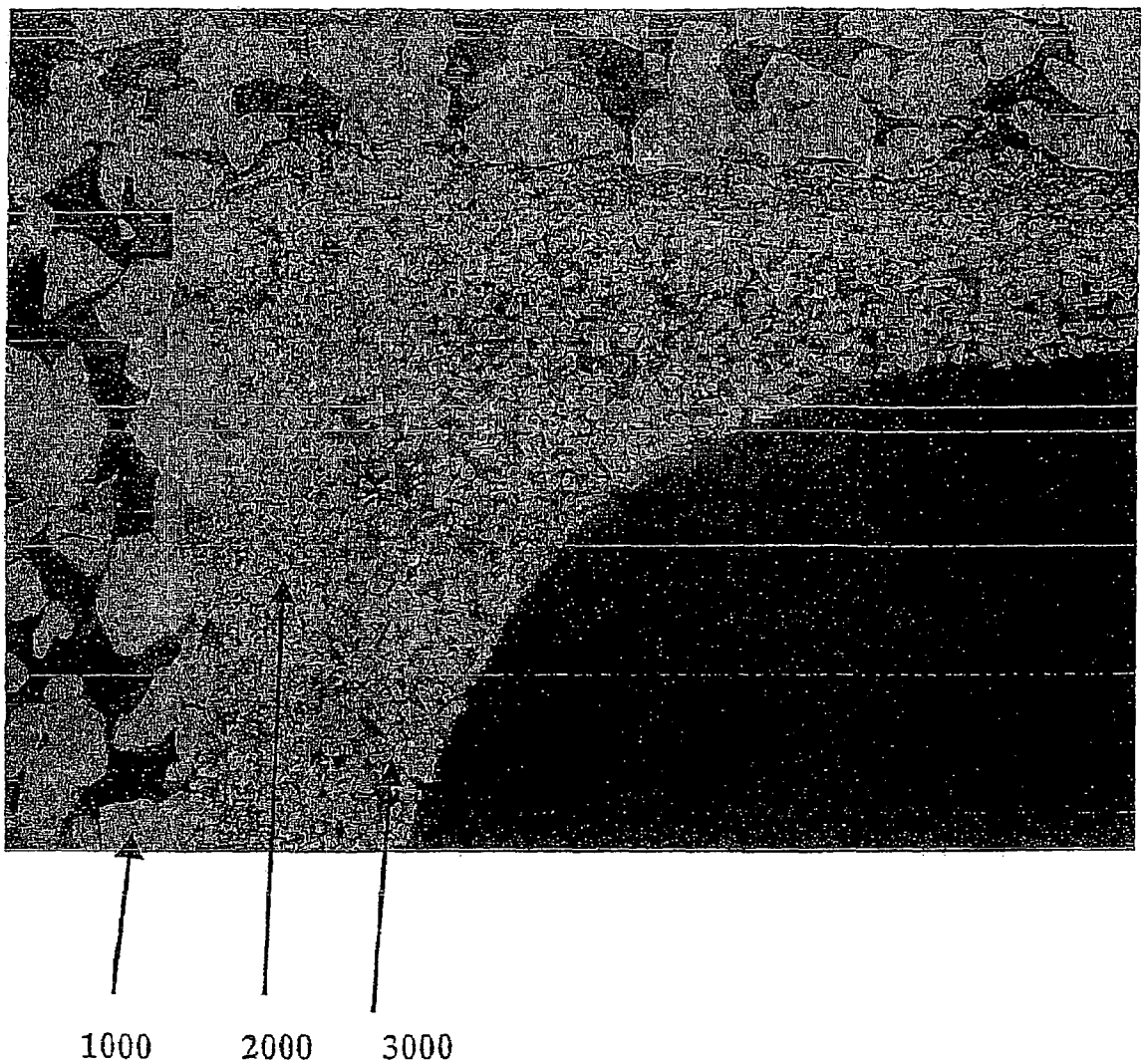
FIG. 6. Illustrates a polished section of a two-layer SiC membrane with underfiring with undesirable residues of second grain in the structure.

FIG. 5 uses the example of a double layer to illustrate the effects of underfiring; for demonstration purposes, both an unfired first layer (2000) and a finer second layer (3000) on the SiC carrier (1000) were exposed to a temperature treatment that was not quite adequate for the second layer. The outcome is that the first SiC grains are still sharp-edged and the voids contain fractions of second grain, with the first layer, which requires a higher temperature, containing much more fine grain as expected.

Figure 7:
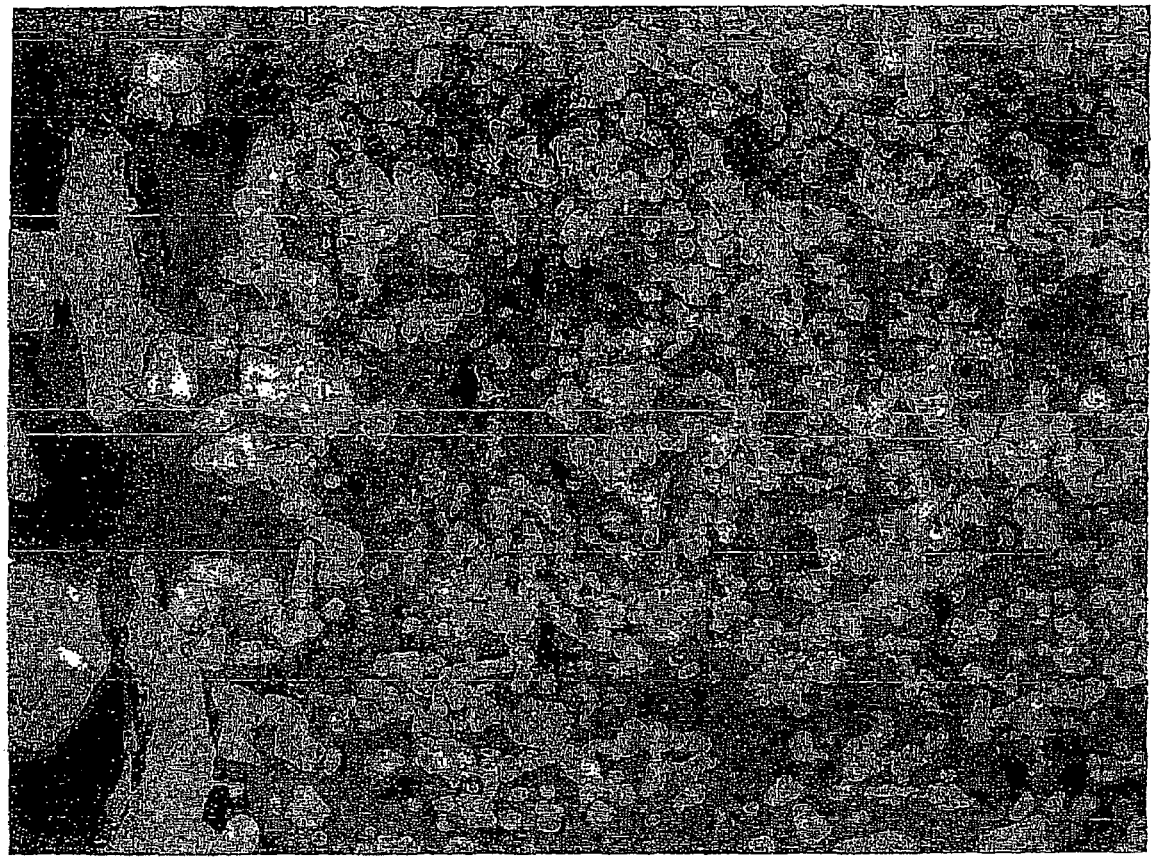
FIG. 7. Illustrates a polished section of a two-layer SiC membrane with overfiring of the second layer, characterized by undesirable large pores and giant grain growth through concretion of several SiC grains.

FIG. 7 shows in the right section an overfired second layer with giant grain growth. Characteristics of the giant grain growth are the knitting together of first SiC grains, at the same time, isolated undesirable large pores are formed by material rearrangement with no change in volume.

The invention claimed is:

1. A method for the production of a porous ceramic body comprising the following steps:
    selecting a first ceramic powder with a first grain size class, wherein the first ceramic powder substantially comprises α-SiC grains aside from unavoidable contaminants;
    selecting a second ceramic powder with a second grain size class that is substantially smaller than the first grain size class, wherein the second ceramic powder substantially comprises α-SiC grains aside from unavoidable contaminants;
    mixing of the first and second ceramic powders to produce a powder with a bimodal grain size distribution;
    shaping of a molded body from the powder mixture;
    heating and conditioning of the molded body at a temperature from 1750 to 1950 degrees Celsius and for a period of time such that, through recrystallization of the molded body, the grains with the second grain size are dissolved and, through attachment of the material of the second ceramic grains to the first ceramic grains, these are firmly linked to each other; and
    layer-wide repeating of said selecting first and second ceramic powders, said mixing of the first and second ceramic powders, said shaping of a molded body, and said heating and conditioning of the molded body with ever decreasing mean grain sizes such that a gradient with regard to the mean grain size is created transverse to the layers in the ceramic body.

2. The method of claim 1, wherein at least one chosen from the grains of the first ceramic powder and the second ceramic powder have at least one chosen from a defined maximum grain size and a defined minimum grain size.

3. The method of claim 1, wherein mixing of the first and second ceramic powders comprises the ceramic powders being present in a slurry, and wherein said shaping of a molded body is effected by casting.

4. The method of claim 1, including drying the molded body prior to said heating and conditioning.

5. The method of claim 1, wherein the mixing ratio between the first and second ceramic powder lies in the range of approximately 6:1 to 1:1.

6. The method of claim 1, wherein the size ratio between the mean grain size of the smallest grains of the first ceramic powder and the mean grain size of the largest grains of the second ceramic powder lies in the range of approximately 6:1 to 2:1.

7. The method of claim 1, wherein batches of narrow grain size distribution are used for the first and second ceramic grains.

8. The method of claim 1, wherein grain bands or grain mixtures having defined upper and lower grain size are used for the first ceramic grains and grain bands or grain mixtures having a defined upper grain limit are used for the second ceramic grains, with the size ratio between the finest grain fraction of the first ceramic grains and the largest grain fraction of the second ceramic grains chosen to be at least 2:1.

9. The method of claim 1, wherein shaping of the molded body proceeds on a substrate.

10. The method of claim 1, wherein the ceramic grains are of non-oxide ceramic.

11. The method of claim 1, wherein for a first layer the grain sizes of the first ceramic powder are in the range of 6.5 µm (FEPA 800) to 23 µm (FEPA 360), wherein for a second layer the grain sizes of the first ceramic powder are in the range of 1.5 µm (JIS 7000) to 6.5 µm (FEPA F800), and wherein for a third layer the grain sizes of the first ceramic powder are in the range of 0.5 µm (JIS 10000) to 2 µm (JIS 6000), and wherein the second ceramic powder for the first, second, and third layers is at least one chosen from JIS 6000 for the first layer, JIS 9000 for the second layer, JIS 20000 for the third layer and equivalent grain bands for each of the first, second, and third layers.

12. The method of claim 1, wherein heating and conditioning comprises selecting the temperature and firing duration such that generally all grains of the second ceramic powder are no longer present in the microstructure of the finished ceramic body and such that the grain size remains as close as possible in the region of the initial grain size of the first ceramic powder to thereby generally prohibit giant grain growth.

13. The method of claim 1, wherein grain sizes in the range of 0.9 μm to 17 μm are used for the first ceramic powder and grain sizes in the range of 0.2 μm to 3 μm are used for the second ceramic powder.

14. A porous ceramic body, said ceramic body made by
selecting a first ceramic powder with a first grain size class, wherein the first ceramic powder substantially comprises α-SiC grains aside from unavoidable contaminants;
selecting a second ceramic powder with a second grain size class that is substantially smaller than the first grain size class, wherein the second ceramic powder substantially comprises α-SiC grains aside from unavoidable contaminants;
mixing of the first and second ceramic powders to produce a powder with a bimodal grain size distribution;
shaping of a molded body from the powder mixture; and
heating and conditioning of the molded body at a temperature from 1750 to 1950 degrees Celsius and for a period of time such that, through recrystallization of the molded body, the grains with the second grain size are dissolved and, through attachment of the material of the second ceramic grains to the first ceramic grains, these are firmly linked to each other;
said ceramic body comprising a substantially homogeneous structure of interconnected open pores and ceramic grains, with said ceramic grains having a substantially rounded shape, and with both said ceramic grains and said open pores lying substantially in defined ranges in at least one chosen from a narrow grain size range and a narrow pore size range, wherein the defined ranges of said narrow grain size range or said narrow pore size range distribution are present as in a form of at least one layer on a coarse-porous support, and said ceramic body substantially comprises recrystallized RSiC aside from unavoidable contaminants.

15. The ceramic body of claim 14, wherein said ceramic grains are present in substantially completely crystalline form.

16. The ceramic body of claim 14, wherein said ceramic body is substantially free of melt phase.

17. The ceramic body of claim 14, wherein said ceramic grains are of non-oxide ceramic and substantially of the same type.

18. The ceramic body of claim 14, wherein said ceramic body has adequate strength for use as a filter membrane.

19. A cross-flow membrane filter, said filter comprising a ceramic body on a SiC coarse-porous support, said ceramic body including at least one layer, said at least one layer including;
a first ceramic powder, said first ceramic powder substantially comprising SiC and having a first grain size, and
a second ceramic powder, said second ceramic powder substantially comprising SiC and having a second grain size, said second grain size being substantially smaller than said first grain size,
said ceramic body made by;
selecting the first ceramic powder with the first grain size class, wherein the first ceramic powder substantially comprises α-SiC grains aside from unavoidable contaminants;
selecting the second ceramic powder with the second grain size class that is substantially smaller than the first grain size class, wherein the second ceramic powder substantially comprises α-SiC grains aside from unavoidable contaminants;
mixing of the first and second ceramic powders to produce a powder with a bimodal grain size distribution;
shaping of a molded body from the powder mixture; and
heating and conditioning of the molded body at a temperature from 1750 to 1950 degrees Celsius and for a period of time such that, through recrystallization of the molded body, the grains with the second grain size are dissolved and, through attachment of the material of the second ceramic grains to the first ceramic grains, these are firmly linked to each other;
wherein via recrystallization said second ceramic powder is dissolved and attached to said first ceramic powder such that said second ceramic powder is firmly linked to said first ceramic powder, and wherein said ceramic body comprises a substantially homogenous structure of interconnected open pores and ceramic grains with said ceramic grains having a substantially rounded shape, and wherein said ceramic grains and said open pores lie substantially in defined ranges in at least one chosen from a narrow grain size range and a narrow pore size range.

20. The filter of claim 19, said filter exhibiting at 1 bar TMP in the test on water a flow greater than 5 $m^3$ per $m^2$ per bar per hour when said ceramic body includes two layers, and greater than 3 $m^3$ per $m^2$ bar per hour when said ceramic body includes three layers.

21. The filter of claim 19, wherein said filter further comprises a layer of porous oxide ceramic adapted for nanofiltration.

22. The method of claim 5, wherein the mixing ratio between the first and second ceramic powder lies in the range of approximately 4:1 to 2:1.

23. The method of claim 6, wherein the size ratio between the mean grain size of the smallest grains of the first ceramic powder and the mean grain size of the largest grains of the second ceramic powder is approximately 3:1.

24. The method of claim 9, wherein the substrate comprises a porous ceramic body of the same material, and wherein shaping of the molded body proceeds in pore channels of the substrate.

25. The ceramic body of claim 14, wherein said layers on said coarse-porous support are present in pore channels of said coarse-porous support.

26. The ceramic body of claim 18, wherein said ceramic body has adequate strength for use as a cross-flow membrane filter.

27. The filter of claim 20, wherein said filter exhibits a flow of approximately 8 $m^3$ per per bar per hour when said ceramic body includes two layers, and wherein said filter exhibits a flow of approximately 6 $m^3$ per $m^2$ per bar per hour when said ceramic body includes three layers.

* * * * *